(12) United States Patent
Nakaniwa et al.

(10) Patent No.: US 9,611,742 B2
(45) Date of Patent: Apr. 4, 2017

(54) IMPELLER, ROTOR COMPRISING SAME, AND IMPELLER MANUFACTURING METHOD

(75) Inventors: Akihiro Nakaniwa, Tokyo (JP); Hitoshi Shinohara, Hiroshima (JP)

(73) Assignees: MITSUBISHI HEAVY INDUSTRIES, LTD., Tokyo (JP); MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 647 days.

(21) Appl. No.: 13/976,108

(22) PCT Filed: Feb. 17, 2012

(86) PCT No.: PCT/JP2012/053783
§ 371 (c)(1),
(2), (4) Date: Jun. 26, 2013

(87) PCT Pub. No.: WO2012/114996
PCT Pub. Date: Aug. 30, 2012

(65) Prior Publication Data
US 2013/0272895 A1    Oct. 17, 2013

(30) Foreign Application Priority Data
Feb. 24, 2011   (JP) .................................. 2011-038380

(51) Int. Cl.
*F01D 5/14*   (2006.01)
*F04D 29/26*  (2006.01)
(Continued)

(52) U.S. Cl.
CPC .............. *F01D 5/14* (2013.01); *B23P 15/006* (2013.01); *F04D 29/266* (2013.01);
(Continued)

(58) Field of Classification Search
CPC ........ B23P 15/006; F01D 5/14; F04D 29/266; F04D 29/28; F04D 29/281; F04D 29/284;
(Continued)

(56) References Cited

U.S. PATENT DOCUMENTS 2,438,866 A * 3/1948 Rockwell ................ F01D 5/025
192/104 C
2,613,609 A * 10/1952 Buchi ..................... F01D 5/025
416/186 R
(Continued)

FOREIGN PATENT DOCUMENTS

CN   2069501       1/1991
CN   2069501 U  *  1/1991
(Continued)

OTHER PUBLICATIONS

Chinese Office Action issued Jan. 6, 2015 in corresponding Chinese Patent Application No. 201180036597.X with English translation.
(Continued)

*Primary Examiner* — John K Fristoe, Jr.
*Assistant Examiner* — Christopher R Legendre
(74) *Attorney, Agent, or Firm* — Wenderoth, Lind & Ponack, L.L.P.

(57) ABSTRACT

An impeller is formed of two parts, i.e., an inner peripheral side part and an outer peripheral side part. The inner peripheral side part is molded in a cylindrical shape. The outer peripheral side part is formed by integrally molding an annular disc externally fitted to an outer peripheral surface of the inner peripheral side part, a plurality of blades provided at an interval in a circumferential direction on a surface that faces the other side in the axis line direction of the annular disc and forming a flow path extending in a radial direction, and a cover covering the plurality of blades from the other side in the axis line direction and having an
(Continued)

insertion hole to which the inner peripheral side part is inserted in the axis line direction at an interval in a radial direction.

10 Claims, 6 Drawing Sheets

(51) Int. Cl.
*F04D 29/28* (2006.01)
*B23P 15/00* (2006.01)

(52) U.S. Cl.
CPC ........ *F04D 29/284* (2013.01); *F05B 2230/23* (2013.01); *Y10T 29/49316* (2015.01)

(58) Field of Classification Search
CPC ........ F04D 29/34; F04D 29/44; F04D 29/441; Y10T 29/49316; Y10T 29/4932; Y10T 29/49321; Y10T 29/49327; Y10T 29/49329
See application file for complete search history.

(56) References Cited

U.S. PATENT DOCUMENTS

| | | | | |
|---|---|---|---|---|
| 2,799,445 | A * | 7/1957 | Hull | F01D 5/025 384/416 |
| 4,173,429 | A * | 11/1979 | Hoffman | F01D 5/025 416/184 |
| 4,183,719 | A | 1/1980 | Bozung | |
| 4,220,372 | A * | 9/1980 | Johansen | B60B 11/02 301/1 |
| 4,231,706 | A * | 11/1980 | Ueda | F04D 29/281 416/186 R |
| 4,602,411 | A * | 7/1986 | Brown | B23P 15/006 285/382.4 |
| 4,697,987 | A | 10/1987 | Katayama et al. | |
| 4,795,311 | A * | 1/1989 | Arkhipov | F04D 29/284 416/186 R |
| 4,986,736 | A | 1/1991 | Kajiwara | |
| 6,481,970 | B2 * | 11/2002 | Mukherjee | F04D 25/04 416/204 A |
| 7,341,430 | B2 * | 3/2008 | Sano | F16H 41/26 164/131 |
| 2010/0008775 | A1 | 1/2010 | Vedsted et al. | |
| 2010/0037458 | A1 | 2/2010 | Ranz et al. | |
| 2010/0189568 | A1 | 7/2010 | Watanabe et al. | |
| 2011/0200439 | A1 | 8/2011 | Nakaniwa et al. | |
| 2013/0272895 | A1 * | 10/2013 | Nakaniwa | B23P 15/006 416/241 R |
| 2014/0064975 | A1 * | 3/2014 | Yagi | F04D 29/285 416/213 R |

FOREIGN PATENT DOCUMENTS

| | | |
|---|---|---|
| CN | 1300350 | 6/2001 |
| CN | 2763589 | 3/2006 |
| CN | 101255871 | 9/2008 |
| CN | 205117803 U * | 3/2016 |
| DE | 755198 | 11/1952 |
| DE | 44 27 115 | 4/1995 |
| DE | 4427115 C1 * | 4/1995 ........... F04D 29/023 |
| DE | 10 2009 031 737 | 7/2011 |
| EP | 0 283 825 | 7/1992 |
| FR | 1 471 604 | 3/1967 |
| JP | 55-4376 | 1/1980 |
| JP | 55-5456 | 1/1980 |
| JP | 58-72491 | 5/1983 |
| JP | 61-142393 | 6/1986 |
| JP | 61212601 A * | 9/1986 |
| JP | 04031695 A * | 2/1992 |
| JP | 2788818 | 8/1998 |
| JP | 2001-355595 | 12/2001 |
| JP | 2002-235694 | 8/2002 |
| JP | 2003-293988 | 10/2003 |
| JP | 2004-036444 | 2/2004 |
| JP | 2004-60460 | 2/2004 |
| JP | 2004-308647 | 11/2004 |
| JP | 2008-223540 | 9/2008 |
| JP | 2009-156122 | 7/2009 |
| JP | 4428044 | 3/2010 |
| JP | 2010-230012 | 10/2010 |
| JP | 2010-285919 | 12/2010 |
| JP | 2013-139753 | 7/2013 |
| JP | 2013139753 A * | 7/2013 |

OTHER PUBLICATIONS

Yuxin Cai, "Improvement in Process of Manufacturing an Impeller for a Centrifugal Drum Pressure Fan," Mechanical and Electrical Engineering Technology, No. 4, pp. 58-60, Aug. 30, 2001, cited in Office Action.
International Search Report issued Mar. 19, 2012 in International (PCT) Application No. PCT/JP2011/078790 with English translation.
International Search Report issued May 22, 2012 in International (PCT) Application No. PCT/JP2012/053783 with English translation.
Written Opinion of the International Searching Authority issued Mar. 19, 2012 in International (PCT) Application No. PCT/JP2011/078790 with English translation.
Written Opinion of the International Searching Authority issued May 22, 2012 in International (PCT) Application No. PCT/JP2012/053783 with English translation.
Extended European Search Report issued Jul. 24, 2015 in corresponding European Patent Application No. 11869760.6.
Office Action issued Nov. 3, 2015 in related U.S. Appl. No. 13/812,617.
International Search Report issued Mar. 12, 2013 in International Application No. PCT/JP2012/083427, with English translation.
Written Opinion of the International Searching Authority issued Mar. 12, 2013 in International Application No. PCT/JP2012/083427, with English translation.
Extended European Search Report issued May 18, 2015 in European Application No. 12861319.7.
Office Action issued May 29, 2015 in Chinese Application No. 201280019373.2, with English translation.
Office Action issued Apr. 1, 2016 in U.S. Appl. No. 14/114,584.
Office Action issued Apr. 29, 2016 in U.S. Appl. No. 13/812,617.
Office Action issued Sep. 9, 2016 in U.S. Appl. No. 14/114,584.
Office Action issued Nov. 15, 2016 in U.S. Appl. No. 13/812,617.
Notice of Allowance issued Feb. 8, 2017 in U.S. Appl. No. 14/114,584.
Advisory Action issued Jan. 11, 2017 in U.S. Appl. No. 14/114,584.

* cited by examiner

IMPELLER, ROTOR COMPRISING SAME, AND IMPELLER MANUFACTURING METHOD

TECHNICAL FIELD

The present invention relates to an impeller and a rotor having this impeller fixed to a rotating shaft, for example, in a rotary machine such as a centrifugal compressor. Priority is claimed on Japanese Patent Application No. 2011-038380, filed Feb. 24, 2011, the content of which is incorporated herein by reference.

BACKGROUND ART

Figure 6:
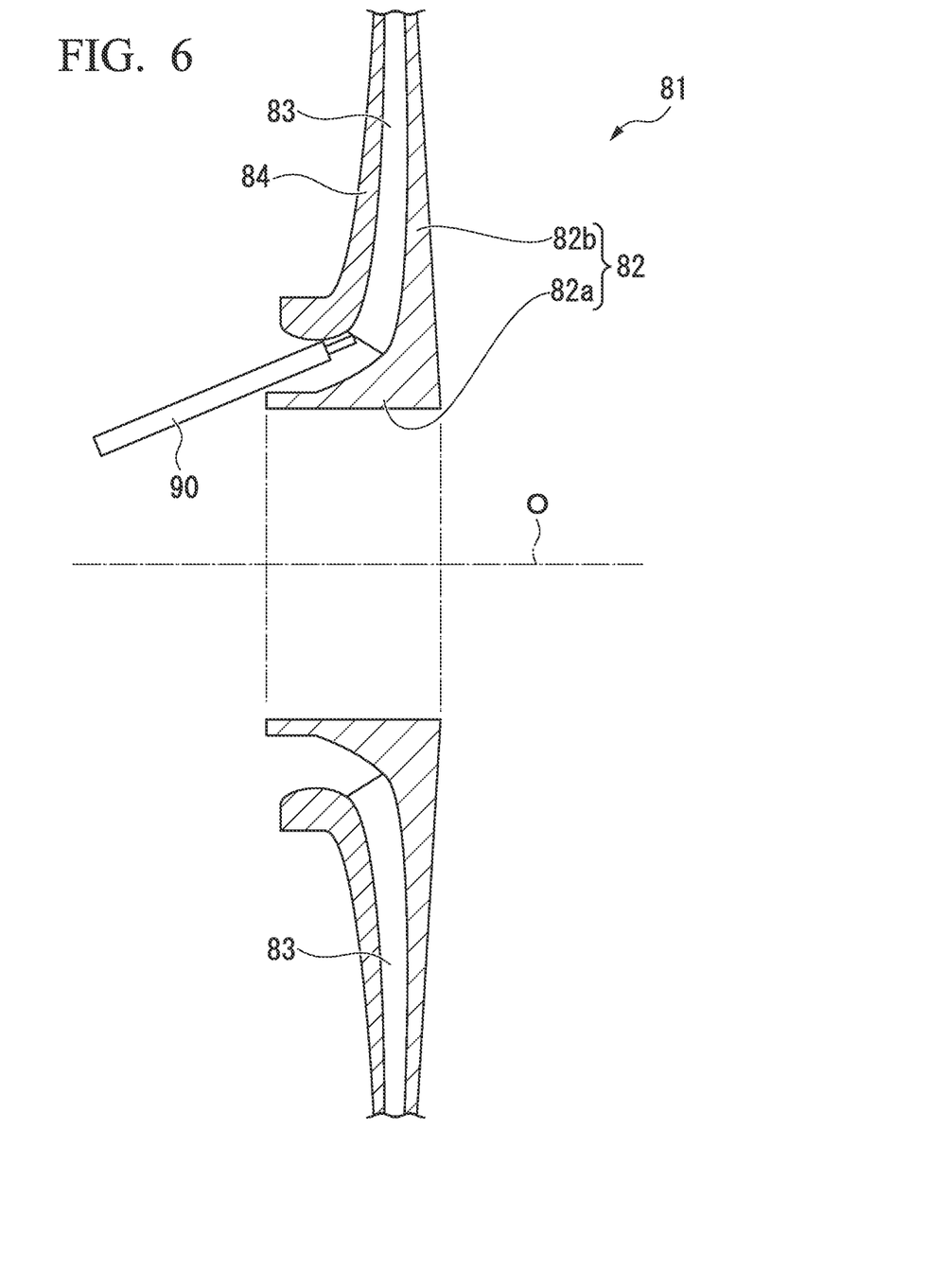
FIG. 6 is a cross-sectional view including an axis line of a rotor according to a conventional example.

As shown in FIG. 6, an impeller 81 used for a rotary machine such as a centrifugal compressor includes a disc 82, blades 83, and a cover 84.

The disc 82 in this impeller 81 includes a cylindrical portion 82a and an annular disc portion 82b that are molded integrally. The cylindrical portion 82a is externally fitted to a rotating shaft. The annular disc portion 82b protrudes from a portion at one side (a right side in FIG. 6) in an axis line O direction on an outer peripheral surface of the cylindrical portion 82a to an outer side in a radial direction. A plurality of blades 83 are arranged at intervals in a circumferential direction on a surface at the other side (a left side in FIG. 6) in the axis line O direction of the annular disc portion 82b. Further, the cover 84 is integrally attached to cover the blades 83 from the other side in the axis line O direction.

In such an impeller 81, a portion on the other side in the axis line O direction on an inner peripheral surface of the cylindrical portion 82a of the disc 82 is integrally fixed to the rotating shaft by being shrink-fitted to the rotating shaft. As only the portion on the inner peripheral surface of the cylindrical portion 82a is shrink-fitted in this way, attachment and detachment of the impeller 81 to or from the rotating shaft can be easily performed. Further, a shrink fitting place is spaced from a center of gravity of the impeller 81. As a result, it is possible to prevent the impeller 81 from deviating from the rotating shaft due to centrifugal force at the time of rotation.

A scheme of individually molding the disc 82, the blades 83 and the cover 84 and then integrating these members through welding is known as a method of manufacturing the impeller 81. However, in the method of manufacturing the impeller 81, welding distortion, a welding defect or the like may occur.

In contrast, a manufacturing method of integrally molding the disc 82, the blades 83 and the cover 84 by performing a cutting process on an impeller material as a base material using a machining tool 90 has been proposed.

Further, for example, a method of manufacturing an impeller by diffusion-bonding an inner peripheral side part and an outer peripheral side part that have formed a flow path between blades, in such a manner that the flow paths are connected to each other, has been proposed in Patent Document 1.

PRIOR ART DOCUMENT

Patent Document

Patent Document 1: Japanese Unexamined Patent Application, First Publication No. 2004-36444

SUMMARY OF INVENTION

Problem to be Solved by the Invention

When the impeller 81 is integrally molded, it is desirable to shorten a processing time. Accordingly, when the impeller 81 shown in FIG. 6 is integrally molded, it is desirable for the machining tool 90 to be able to easily access a place of the impeller material that becomes the flow path between the blades 83. However, in the impeller 81 of FIG. 6, it is difficult to perform processing for a desired shape due to the machining tool 90 interfering with portions of the impeller material that become the cylindrical portion 82a of the disc 82 and the cover 84. Accordingly, processing requires a lot of time and effort, which causes an increase in manufacturing cost.

Figure 7:
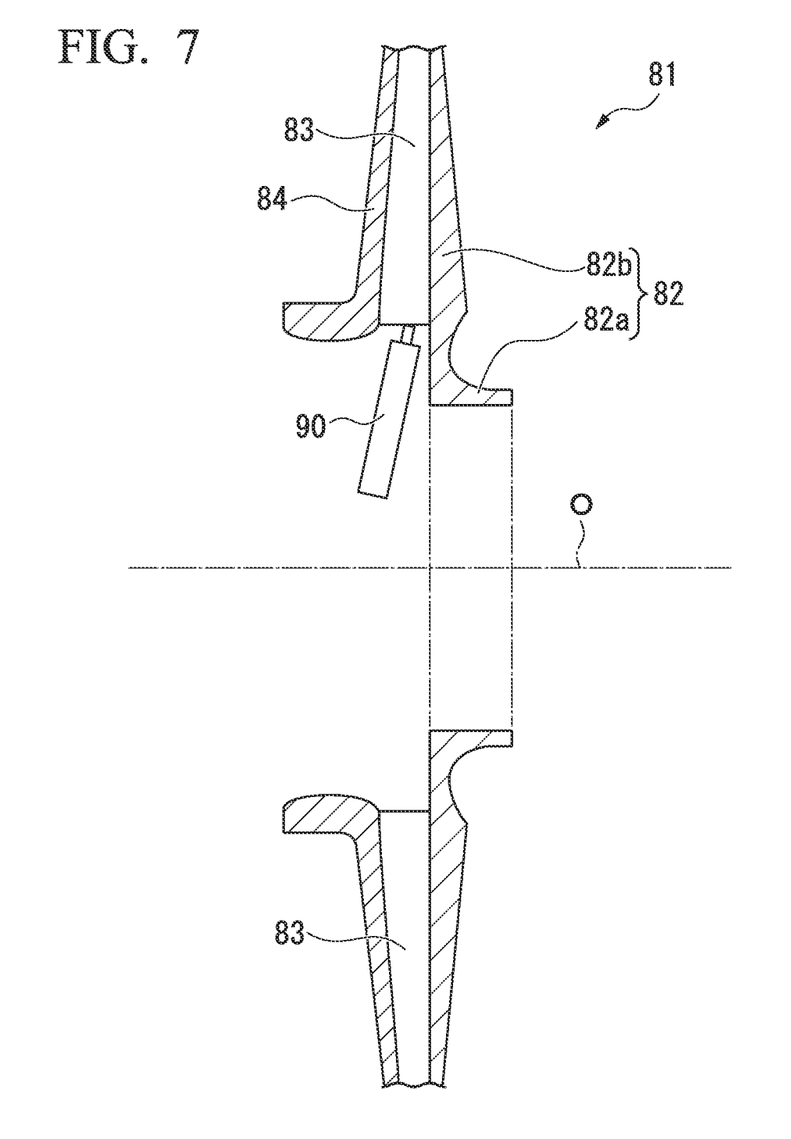
FIG. 7 is a cross-sectional view including an axis line of a rotor according to a conventional example.

In contrast, for example, a configuration shown in FIG. 7 is considered to improve a characteristic of access of a machining tool 90 to a flow path. In other words, a cylindrical portion 82a of a disc 82 is molded to extend to one side in an axis line direction from an annular disc portion 82b. Further, a portion at the one side in the axis line direction on an inner peripheral surface of the cylindrical portion 82a becomes a shrink fitting place. However, in this case, the shrink fitting place approaches a position of a gravity center of the impeller 81 in comparison with the impeller 81 shown in FIG. 6. As a result, it is necessary to increase the thickness in a radial direction of the shrink fitting place for withstanding centrifugal force, which causes an increase in cost.

Furthermore, it may be considered to space a position of the shrink fitting place further from the center of gravity by further extending the cylindrical portion 82a to the one side in the axis line direction is considered. In this case, however, for example, in a centrifugal compressor including plural stages of impellers 81, the rotating shaft lengthens and the rigidity of the shaft decreases.

Meanwhile, in the impeller disclosed in Patent Document 1, the accessibility of the machining tool to both the inner peripheral side part and the outer peripheral side part is high. However, it is necessary to form flow paths in both the inner peripheral side part and the outer peripheral side part and perform diffusion bonding so that the flow paths communicate with each other. This causes an increase in manufacturing cost.

The present invention has been made in view of such problems and an object of the present invention is to provide an impeller capable of suppressing manufacturing cost to be low.

Means for Solving the Problems

The present invention provides the following means in order to solve the above problems.

According to a first aspect of the present invention, an impeller includes an inner peripheral side part and an outer peripheral side part, wherein the inner peripheral side part is formed in a cylindrical shape around an axis line; and the outer peripheral side part includes an annular disc externally fitted to a portion at one side in the axis line direction in an outer peripheral surface of the inner peripheral side part, a plurality of blades that are provided at intervals in a circumferential direction on a surface that faces the other side in the axis line direction of the annular disc and form a flow path extending in a radial direction, and a cover that covers the plurality of blades from the other side in the axis line direction and has an insertion hole into which the inner peripheral side part is inserted in the axis line direction at an interval in a radial direction. The outer peripheral side part is configured the annular disc, the blades and the cover are integrally molded.

In such an impeller according to the first aspect, since the inner peripheral side part is formed in a cylindrical shape, it is possible to easily mold the inner peripheral side part through a cutting process. Further, the outer peripheral side part has a configuration in which the blades are provided at the other side in the axis line direction of the annular disc, and the cover is further provided at the other side in the axis line direction of the blade. Accordingly, in a step before the outer peripheral side part is externally fitted to the inner peripheral side part, there is nothing in inner sides in the radial direction of the blade and the flow path. Thus, it is possible for the machining tool to easily access the blades and the flow path formed between the blades from an inner side in the radial direction.

Further, through only a process of externally fitting the annular disc of the outer peripheral side part to the inner peripheral side part, the inner peripheral side part and the annular disc constitute the disc, thereby obtaining the impeller including the disc, the blades and the cover.

Further, according to a second aspect of the present invention, in the impeller, the annular disc is externally fitted to the inner peripheral side part through shrink fitting.

It is possible to perform the fitting more firmly by fitting the outer peripheral side part to the inner peripheral side part through shrink fitting. Further, it is possible to achieve a reduction of cost in comparison with, for example, a case in which diffusion bonding or the like is performed.

Further, according to a third aspect of the present invention, in the impeller, an edge portion rising in a cylindrical shape from an inner side in a radial direction thereof to the other side in the axis line direction is provided in the cover, and an introduction portion of a fluid to the flow path is formed of the edge portion and an outer peripheral surface of the inner peripheral side part.

According to the third aspect of the present invention, the introduction portion to the flow path is formed of the edge portion of the cover and the outer peripheral surface of the inner peripheral side part. As a result, it is possible to smoothly guide a fluid to the flow path between the blades.

In the impeller according to a fourth aspect of the present invention, at least a portion of a fitting portion of the inner peripheral side part and the annular disc of the outer peripheral side part is formed in a step shape.

With this configuration, it is possible to easily determine positions in the axis line direction of the inner peripheral side part and the outer peripheral side part.

In the impeller according to a fifth aspect of the present invention, at least a portion of the fitting portion of the inner peripheral side part and the annular disc of the outer peripheral side part is formed in a tapered shape.

With this configuration, surface pressure of the fitting portion can be constant. Accordingly, it is possible to maintain the center of gravity of the impeller at an appropriate place and avoid backlash or the like at the time of rotation.

Further, in the impeller according to a sixth aspect of the present invention, a key member that fixes the inner peripheral side part and the outer peripheral side part to each other is interposed in the fitting portion of the inner peripheral side part and the annular disc of the outer peripheral side part.

With this configuration, it is possible to more firmly fix and integrate the inner peripheral side part and the outer peripheral side part.

According to a seventh aspect of the present invention, a rotor includes any one of the above impellers; and a rotating shaft to which a portion at the other side in the axis line direction of the inner peripheral surface of the inner peripheral side part of the impeller is externally fitted.

With this configuration, in the rotor, since only a portion of the inner peripheral surface of the inner peripheral side part is externally fitted to the rotating shaft, attachment and detachment of the impeller to or from the rotating shaft can be easily performed.

According to an eighth aspect of the present invention, in the rotor, the inner peripheral side part is externally fitted to the rotating shaft through shrink fitting.

As a result, it is possible to more firmly attach the rotor to the rotating shaft.

According to a ninth aspect of the present invention, a rotor is a rotor including any one of the above impellers, and a rotating shaft that rotates integrally with the impeller, wherein the inner peripheral side part of the impeller is integrally molded with the rotating shaft.

In this case, it is unnecessary to perform a task of fixing the inner peripheral side part to the rotating shaft. Accordingly, it is possible to reduce the number of work processes when the rotor is formed.

According to a tenth aspect of the present invention, a impeller manufacturing method is a method of manufacturing an impeller including an inner peripheral side part and an outer peripheral side part, the method including steps of: molding the inner peripheral side part that is in a cylindrical shape around an axis line; integrally molding the outer peripheral side part including an annular disc capable of being externally fitted to a portion at one side in the axis line direction in an outer peripheral surface of the inner peripheral side part, a plurality of blades that are provided at intervals in a circumferential direction on a surface that faces the other side in the axis line direction of the annular disc and form a flow path extending in a radial direction, and a cover that covers the plurality of blades from the other side in the axis line direction and has an insertion hole into which the inner peripheral side part is inserted in the axis line direction at an interval in the radial direction; and fixing and integrating the inner peripheral side part and the outer peripheral side part by externally fitting the annular disc to a portion of the inner peripheral side part at the other side in the axis line direction.

With the impeller manufacturing method having such a characteristic, it is possible to easily mold the inner peripheral side part due to its simple shape. It is also possible for a machining tool to easily access the blades and the flow path in the outer peripheral side part. Further, it is possible to easily obtain an impeller only by externally fitting the outer peripheral side part to the inner peripheral side part.

Effects of the Invention

According to the present invention, it is possible to easily integrally mold each of the inner peripheral side part and the outer peripheral side part. Further, it is possible to form the impeller by fitting the inner peripheral side part and the outer peripheral side part to each other. Thus, it is possible to shorten the manufacturing time and reduce the manufacturing cost.

DESCRIPTION OF THE EMBODIMENTS

Hereinafter, an embodiment of the present invention will be described with reference to the accompanying drawing.

Figure 1:
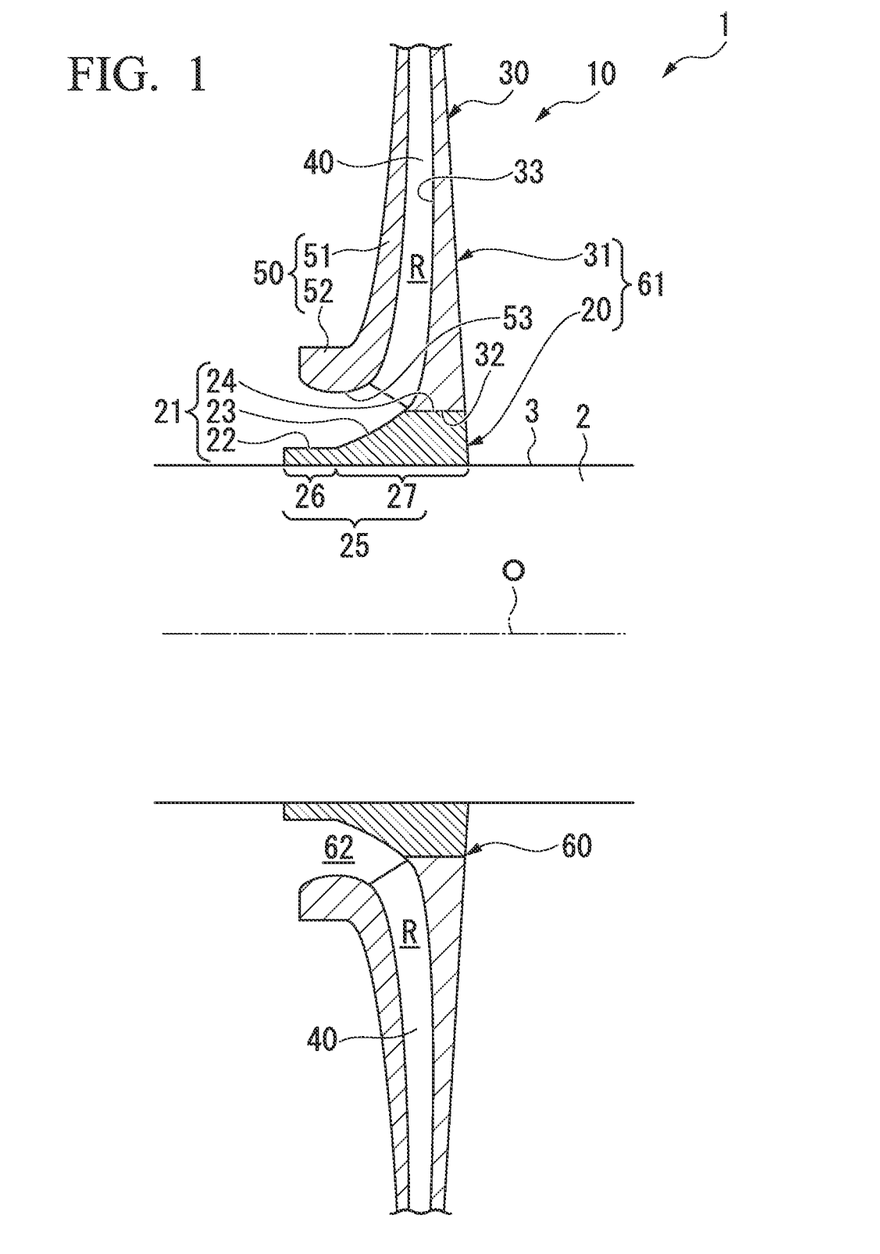
FIG. 1 is a cross-sectional view including an axis line of a rotor according to an embodiment of the present invention.

A rotor 1 is, for example, a member used for a rotary machine such as a compressor or a turbine. As shown in FIG. 1, the rotor 1 has a configuration in which an impeller 10 is integrally attached to an outer peripheral side of a rotating shaft 2. The rotating shaft 2 is a member having a cylindrical shape extending in an axis line O direction and being rotatable around the axis line O. The impeller 10 is a member that sends a fluid flowing in the axis line O direction to an outer side in a radial direction.

Hereinafter, a right side in FIG. 1 is referred to as "one side in the axis line O direction" and a left side of FIG. 1 is referred to as "the other side in the axis line O direction." This one side in the axis line O direction is the downstream side of the fluid. Further, the other side in the axis line O direction is the upstream side of the fluid.

The impeller 10 includes two members: an inner peripheral side part 20 and an outer peripheral side part 30.

The inner peripheral side part 20 is formed in a substantially cylindrical shape around the axis line O. An outer peripheral surface 21 of the inner peripheral side part 20 includes a small-diameter portion 22, an enlarged-diameter portion 23 and a large-diameter portion 24.

The small-diameter portion 22 is a portion including an end portion at the other side in the axis line O direction in the outer peripheral surface 21 of the inner peripheral side part 20. The enlarged-diameter portion 23 is a portion which is located continuously to the one side in the axis line O direction of the small-diameter portion 22 and whose diameter is gradually increased toward the one side in the axis line O direction. Further, the large-diameter portion 24 is a portion which is arranged continuously to the one side in the axis line O direction of the enlarged-diameter portion 23 and includes an end portion of the one side in the axis line O direction in the outer peripheral surface 21 of the inner peripheral side part 20. The diameter of the large-diameter portion 24 is slightly greater than that of the small-diameter portion 22.

Further, an inner peripheral surface 25 of the inner peripheral side part 20 includes a first inner peripheral surface 26 and a second inner peripheral surface 27. The first inner peripheral surface 26 is a portion including an end portion at the other side in the axis line O direction in the inner peripheral surface 25 of the inner peripheral side part 20, i.e., a portion corresponding to the small-diameter portion 22 of the outer peripheral surface 21. The inner diameter of the first inner peripheral surface 26 is set to be slightly smaller than the outer diameter of the outer peripheral surface 21 of the inner peripheral side part 20. The second inner peripheral surface 27 is a portion that is located continuously to the one side in the axis line O direction of the first inner peripheral surface 26 in the inner peripheral surface 25 of the inner peripheral side part 20 and includes an end portion at the one side in the axis line O direction of the inner peripheral surface 25. Further, an inner diameter of the second inner peripheral surface 27 is set to a size such that the rotating shaft 2 can be inserted.

The outer peripheral side part 30 is a member in which the annular disc 31, the blades 40 and the cover 50 have been integrally molded.

The annular disc 31 is a disc-shaped member formed around the axis line O. A fitting hole 32 penetrating in the axis line O direction is formed in a center of gravity of the annular disc 31. This fitting hole 32 is formed to have an inner diameter equal to or slightly smaller than the outer diameter of the large-diameter portion 24 of the inner peripheral side part 20. Further, a dimension in the axis line O direction of the fitting hole 32 is substantially equal to a dimension in the axis line O direction of the large-diameter portion 24 of the inner peripheral side part 20.

Further, a surface directed in the other side in the axis line O direction of the annular disc 31 has a curved surface 33 that gradually retreats toward the one side in the axis line O direction from an inner side to an outer side in the radial direction.

A plurality of blades 40 are provided to rise from the curved surface 33 of the annular disc 31 to the other side in the axis line O direction. Each blade 40 extends over an entire area in a radial direction of the annular disc 31. Specifically, each blade 40 extends to be curved in one direction in a circumferential direction from an inner side to an outer side in the radial direction. Such a plurality of blades 40 are provided at intervals in the circumferential direction. Further, a space between the blades 40 adjacent in the circumferential direction becomes a flow path R through which a fluid flows.

The cover 50 is a member arranged to cover the plurality of blades 40 from the other side in the axis line O direction and is provided integrally with the blades 40. This cover 50 includes a main body 51 of the cover and an edge portion 52. The main body 51 of the cover is formed in a disc shape around the axis line O. An insertion hole 53 penetrating in the axis line O direction is formed in a center of gravity of the main body 51 of the cover. The edge portion 52 is formed to rise in a cylindrical shape from an inner side in the radial direction of the main body 51 of the cover to the one side in the axis line O direction so that the insertion hole 53 extends to the one side in the axis line O direction. The insertion hole 53 is formed to have an inner diameter greater than the outer diameter of the outer peripheral surface 21 of the inner peripheral side part 20.

In the outer peripheral side part 30 including the annular disc 31, the blades 40 and the cover 50 as described above, there are no other components at inner sides in the radial direction of an end portion at an inner side in the radial direction of the blade 40 and an end portion at an inner side in the radial direction of the flow path R formed between the blades 40. Accordingly, in the outer peripheral side member 30, the blade 40 and the flow path R face the axis line O.

Further, in the present embodiment, the impeller 10 is formed such that the outer peripheral side part 30 is externally fitted to the inner peripheral side part 20 through shrink fitting. Specifically, in the outer peripheral side part 30, the fitting hole 32 thereof is externally fitted to the large-diameter portion 24 in the outer peripheral surface 21 of the inner peripheral side part 20. Further, as the fitting hole 32 is fitted to the large-diameter portion 24, a fitting portion 60 between the inner peripheral side part 20 and the outer peripheral side part 30 is formed.

As the inner peripheral side part 20 and the outer peripheral side part 30 are fitted in this way, the annular disc 31 of the outer peripheral side part 30 and the inner peripheral side part 20 are fixed and integrated. A disc 61 in the impeller 10 is formed of the inner peripheral side part 20 and the annular disc 31 that have been integrated. Further, an introduction portion 62 is formed among the small-diameter portion 22 of the outer peripheral surface 21 of the inner peripheral side part 20, the enlarged-diameter portion 23 and an inner peripheral surface of the insertion hole 53 in the cover 50 of the outer peripheral side part 30. The introduction portion 62 is formed to guide a fluid to the flow path R between the blades 40.

Further, in the impeller 10, the first inner peripheral surface 26 in the inner peripheral surface 25 of the inner peripheral side part 20 is externally fitted to the outer peripheral surface 3 of the rotating shaft 2. Particularly, in the present embodiment, as the first inner peripheral surface 26 is shrink-fitted to the outer peripheral surface 3 of the rotating shaft 2, the impeller 10 with the inner peripheral side part 20 and the rotating shaft 2 are firmly fixed and integrated to thereby form the rotor 1.

Next, a method of manufacturing the impeller 10 will be described.

First, the inner peripheral side part 20 is molded. This inner peripheral side part 20 is molded by cutting a bloom material of an elongated cylindrical shape formed of carbon steel to make a disc-shaped member and performing a cutting process on the disc-shaped member using a machining tool.

Further, the outer peripheral side part 30 is molded separately from molding of the inner peripheral side part 20. This outer peripheral side part 30 is molded by performing the cutting process on a disc-shaped member using the machining tool, similar to the inner peripheral side part 20.

Then, the outer peripheral side part 30 and the inner peripheral side part 20 are fixed and integrated by fitting the outer peripheral side part 30 to the inner peripheral side part 20 by shrink fitting. In other words, for example, the fitting hole 32 of the outer peripheral side part 30 is heated to increase the diameter of the fitting hole 32. In this state, the inner peripheral side part 20 is arranged into the fitting hole 32 of the outer peripheral side part 30. Further, the fitting hole 32 is cooled to decrease the diameter thereof and brought into close contact with the large-diameter portion 24 of the inner peripheral side part 20. Accordingly, the outer peripheral side part 30 and the inner peripheral side part 20 are integrally fixed. Thus, it is possible to obtain the impeller 10 of the present embodiment.

Further, the impeller 10 is externally fitted to the rotating shaft 2 through shrink fitting using the following method, thereby obtaining the rotor 1. First, the first inner peripheral surface 26 in the inner peripheral side part 20 of the impeller 10 is heated to increase the diameter of the insertion hole 53. In this state, the rotating shaft 2 is inserted into the first inner peripheral surface 26 and the second inner peripheral surface 27. The first inner peripheral surface 26 is then cooled to decrease the diameter. Accordingly, the first inner peripheral surface 26 is brought into close contact with the outer peripheral surface 3 of the rotating shaft 2 to thereby integrally fix the impeller 10 and the rotating shaft 2. Thus, it is possible to obtain the rotor 1 of the present embodiment.

As described above, in the impeller 10 of the present embodiment, the inner peripheral side part 20 is formed in a cylindrical shape. Accordingly, it is possible to easily mold the inner peripheral side part 20 by performing the cutting process on the disc-shaped member.

Further, in the outer peripheral side part 30, the blades 40 are provided at the other side in the axis line O direction of the annular disc 31, and the cover 50 is further provided at the other side in the axis line O direction of the blade 40. Accordingly, in a step before the outer peripheral side part 30 is externally fitted to the inner peripheral side part 20, there is nothing in inner sides in the radial direction of the blade 40 and the flow path R. Thus, it is possible for the machining tool to easily access the blades 40 and the flow path R formed between the blades 40 from an inner side in the radial direction. As a result, for example, it is possible to integrally mold the outer peripheral side part 30 using a machining tool such as a five-axis cutting apparatus.

Further, in the present embodiment, it is possible to obtain the impeller 10 including the disc 61, the blade 40 and the cover 50 only by fitting the inner peripheral side part 20 and the outer peripheral side part 30 as described above. Accordingly, it is possible to shorten the manufacturing time and reduce the manufacturing cost.

Further, the fitting of the outer peripheral side part 30 and the inner peripheral side part 20 is performed by the shrink fitting. Accordingly, it is possible to further strengthen the fitting of both of the parts. In addition, it is possible to decrease the manufacturing cost in comparison with, for example, a case in which both of the parts is joined through diffusion bonding.

Further, the introduction portion 62 to the flow path R is formed of the edge portion 52 of the cover 50 and the outer peripheral surface 21 of the inner peripheral side part 20. Accordingly, it is possible to smoothly guide a fluid to the flow path R between the blades 40, for example, when the impeller 10 is applied to a compressor. It is also possible to suppress an increase in manufacturing cost since it is unnecessary to provide a separate member or the like in order to form the introduction portion 62.

Further, in the impeller 10 according to the present embodiment, only a portion of the inner peripheral surface 25 of the inner peripheral side part 20 is externally fitted to the rotating shaft 2. Accordingly, it is possible to easily perform attachment and detachment of the impeller 10 to or from the rotating shaft 2. Furthermore, particularly, the first inner peripheral surface 26 externally fitted to the rotating shaft 2 is arranged in the one side in the axis line O direction of the inner peripheral surface 25 of the inner peripheral side part 20. Accordingly, it is possible to space a fitting position from a center of gravity position of the impeller 10. As a result, it is possible to reduce the influence of the centrifugal force at the time of rotation of the rotor 1 and avoid the impeller 10 deviating from the rotating shaft 2 due to the centrifugal force.

Further, in the present embodiment, the inner peripheral side part 20 of the impeller 10 is externally fitted to the rotating shaft 2 by shrink fitting. Accordingly, it is possible to attach the impeller 10 to the rotating shaft 2 more securely.

While the embodiment of the present invention has been described above in detail, the present invention is not limited thereto and some design changes may be made without departing from the technical scope and spirit of the present invention.

Figure 2:
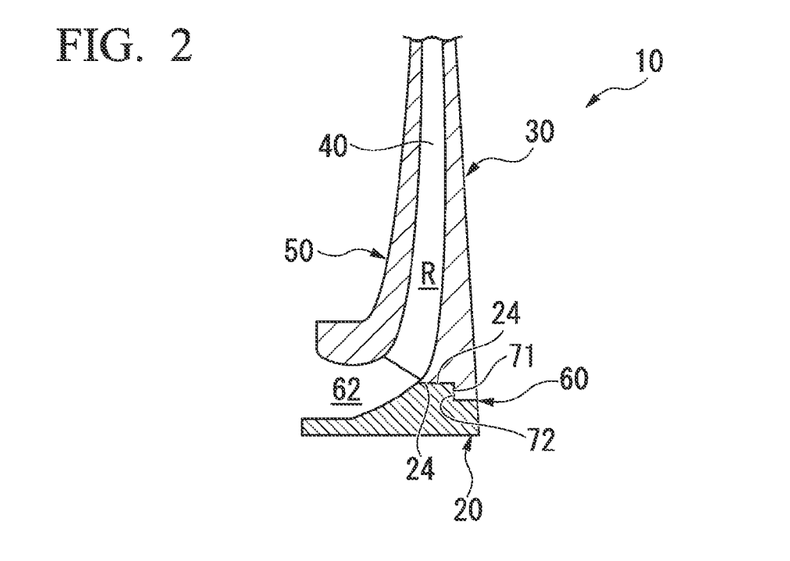
FIG. 2 is a cross-sectional view including an axis line of a rotor according to a first modified example of an embodiment of the present invention.

For example, as a first modified example of the present embodiment, a fitting portion 60 of an inner peripheral side part 20 and an outer peripheral side part 30 may be formed in a step shape, as shown in Fig. 2. In other words, in the first modified example, a diameter of a large-diameter portion 24 of the inner peripheral side part 20 is reduced by one step in an arbitrary position directed from the other side to the one side in the axis line O direction, thereby forming an inner peripheral side step portion 71 toward the one side in the axis line O direction. Further, the diameter of the large-diameter portion 24 of the inner peripheral side part 20 is reduced by one step in an arbitrary position directed from the other side to the one side in the axis line O direction, thereby forming an outer peripheral side step portion 72 toward the other side in the axis line O direction. Further, when the inner peripheral side part 20 and the outer peripheral side part 30 are fitted to each other, the outer peripheral side step portion 72 and the inner peripheral side step portion 71 contact each other.

Accordingly, positions in the axis line O direction of the inner peripheral side part 20 and the outer peripheral side part 30 can be uniformly determined. Thus, it is possible to easily perform positioning in the axis line O direction when the inner peripheral side part 20 and the outer peripheral side part 30 are fitted.

Figure 3:
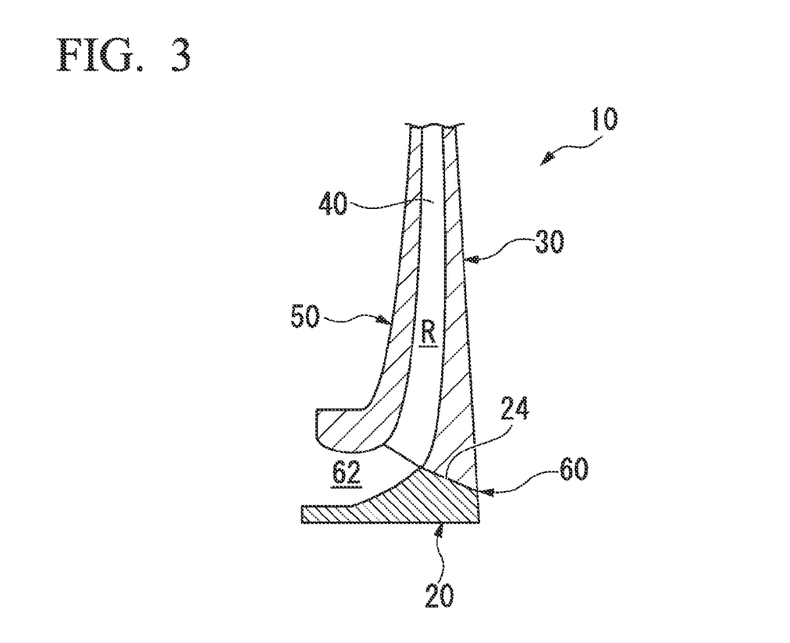
FIG. 3 is a cross-sectional view including an axis line of a rotor according to a second modified example of an embodiment of the present invention.

Further, for example, as a second modified example of the embodiment, a fitting portion 60 of an inner peripheral side part 20 and an outer peripheral side part 30 may be formed in a tapered shape, as shown in FIG. 3. In other words, in this second modified example, a large-diameter portion 24 of the inner peripheral side part 20 is formed in a tapered shape in which a diameter of the large-diameter portion 24 is gradually decreased toward the one side in the axis line O direction. Further, a fitting hole 32 of the outer peripheral side part 30 is formed in a tapered shape in which a diameter of the fitting hole 32 is gradually decreased toward the one side in the axis line O direction. Angles of the tapers of the large-diameter portion 24 and the fitting hole 32 are equal to each other.

Accordingly, since a surface pressure of the fitting portion 60 can be constant, a center of gravity of the impeller 10 can be maintained on an appropriate place. As a result, it is possible to avoid backlash or the like at the time of rotation.

Figure 4:
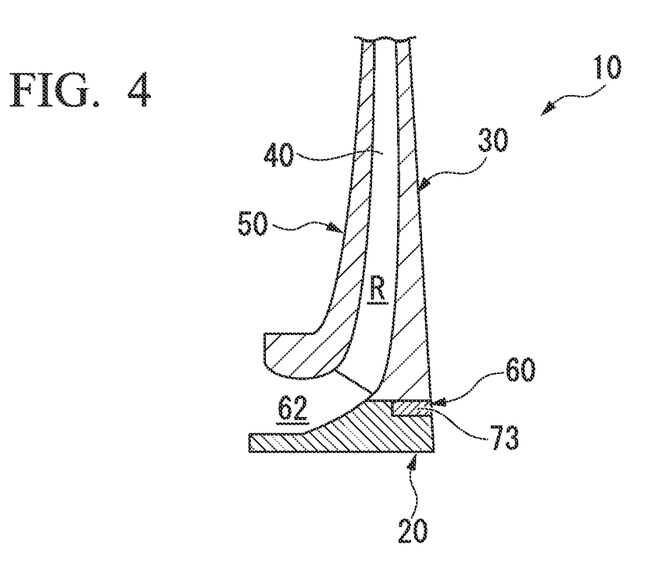
FIG. 4 is a cross-sectional view including an axis line of a rotor according to a third modified example of an embodiment of the present invention.

Further, for example, as a third modified example of the embodiment, a key member 73 that fixes an inner peripheral side part 20 and an outer peripheral side part 30 to each other may be interposed in a fitting portion 60 of the inner peripheral side part 20 and the outer peripheral side part 30, as shown in FIG. 4. Accordingly, the inner peripheral side part 20 and the outer peripheral side part 30 can be more firmly fixed and integrated.

Furthermore, the fitting portion 60 of the inner peripheral side part 20 and the outer peripheral side part 30 may be formed by appropriately combining the first to third modified examples.

Further, the inner peripheral side part 20 and the outer peripheral side part 30 may be fixed and integrated, for example, through spline joining as well as the above structure, or may be fixed and integrated through welding.

Figure 5:
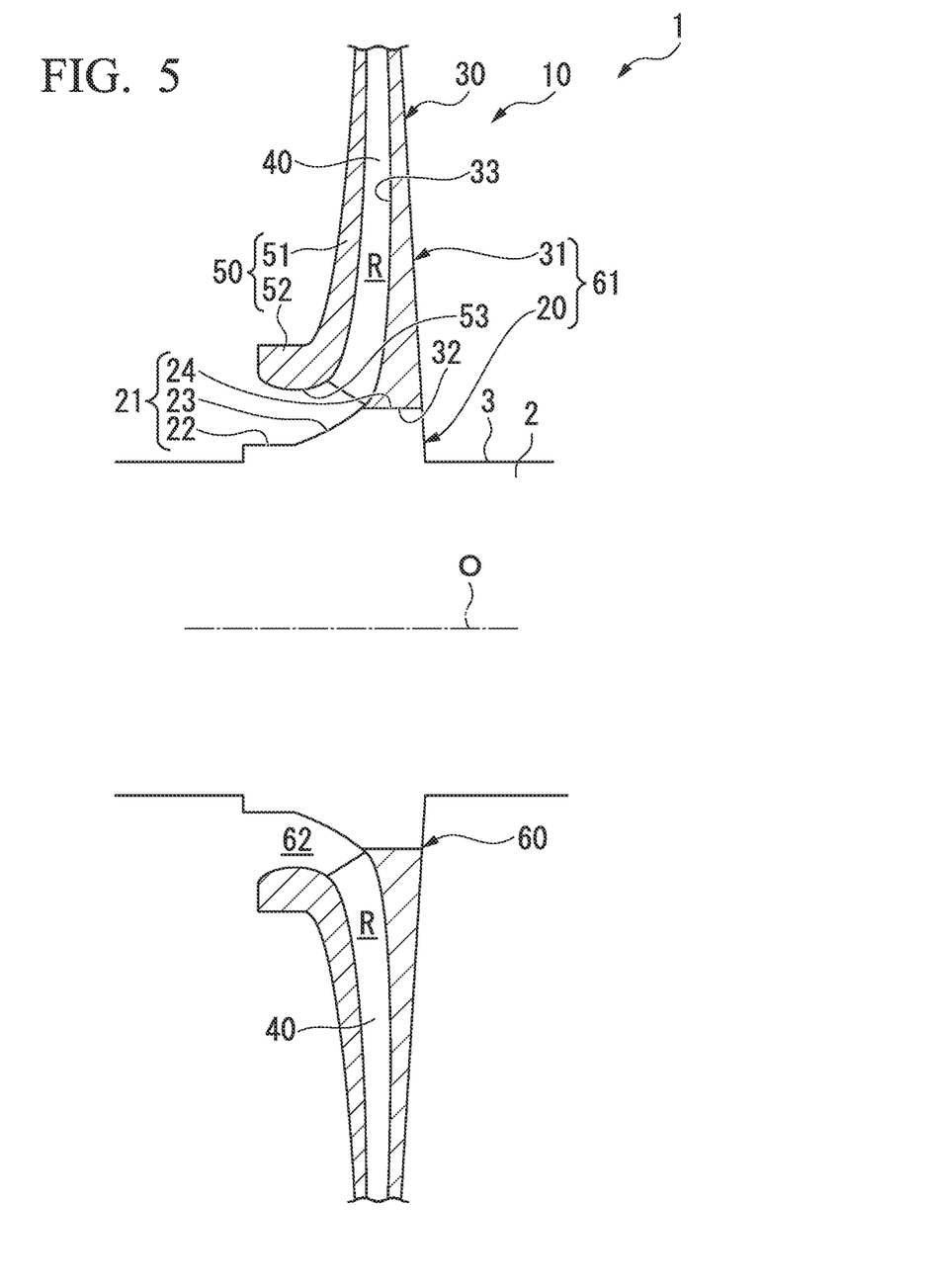
FIG. 5 is a cross-sectional view including an axis line of a rotor according to a fourth modified example of an embodiment of the present invention.

Further, to show, for example, as a fourth modified example of the embodiment, an inner peripheral side part 20 may be integrally formed with a rotating shaft 2, as shown in FIG. 5. In this case, when the rotating shaft 2 is cut out through a cutting process, the inner peripheral side part 20 and the rotating shaft 2 are integrally molded by forming the inner peripheral side part 20 on an outer peripheral surface 3 of the rotating shaft 2. As a result, it is possible to reduce the number of work processes when the rotor 1 is formed since it is unnecessary to perform a task of fixing the inner peripheral side part 20 to the rotating shaft 2.

INDUSTRIAL APPLICABILITY

According to the present invention, it is possible to integrally mold the inner peripheral side part and the outer peripheral side part. Further, it is possible to form the impeller by fitting the inner peripheral side part and the outer peripheral side part to each other. Accordingly, it is possible to provide an impeller capable of reducing manufacturing cost.

REFERENCE SIGNS LIST

1: rotor
2: rotating shaft
3: outer peripheral surface
10: impeller
20: inner peripheral side part
21: outer peripheral surface
22: small-diameter portion
23: enlarged-diameter portion
24: large-diameter portion
25: inner peripheral surface
26: first inner peripheral surface
27: second inner peripheral surface
30: outer peripheral side part
31: annular disc
32: fitting hole
33: curved surface
40: blade
50: cover
51: main body of cover
52: edge portion
53: insertion hole
60: fitting portion
61: disc
62: introduction portion
71: inner peripheral side step portion
72: outer peripheral side step portion
73: key member
O: axis line
R: flow path

The invention claimed is:

1. A rotor comprising:
a rotating shaft;
an inner peripheral side part that forms a first portion of a disc, and that has a cylindrical shape around an axis line; and
an outer peripheral side part that includes an annular disc, a plurality of blades and a cover, wherein
an outer peripheral surface of the inner peripheral side part includes:
a small-diameter portion which is formed with an end portion at a first side of the inner peripheral side part in a direction of the axis line on the outer peripheral surface;
an enlarged-diameter portion which is continuous with the small-diameter portion and extends toward a second side of the inner peripheral side part in the axis line direction from the small-diameter portion and which has a diameter that gradually increases toward the second side in the axis line direction; and
a large-diameter portion which is continuous with the enlarged-diameter portion and extends toward the second side in the axis line direction from the enlarged-diameter portion and which is formed with an end portion at the second side in the axis line direction on the outer peripheral surface, the annular disc forms a second portion of the disc and is capable of externally fitted to the large-diameter portion of the inner peripheral side part, the blades are provided at intervals in a circumferential direction on a surface of the annular disc that faces the first side in the axis line direction and form a flow path extending in a radial direction, and the cover covers the plurality of blades from the first side in the axis line direction, and has an insertion hole into which the inner peripheral side part is inserted in the axis line direction at an interval in a radial direction, the inner peripheral side part is integrally molded with the rotating shaft, in a cross section of the impeller that includes the axis line, the flow path is formed in a curved shape, and the outer peripheral side part is configured such that the annular disc, the blades and the cover are integrally molded.

2. An impeller comprising:

an inner peripheral side part that forms a first portion of a disc, and that has a cylindrical shape around an axis line; and an outer peripheral side part that includes an annular disc, a plurality of blades and a cover, wherein an outer peripheral surface of the inner peripheral side part includes:
  a small-diameter portion which is formed with an end portion at a first side of the inner peripheral side part in a direction of the axis line on the outer peripheral surface;
  an enlarged-diameter portion which is continuous with the small-diameter portion and extends toward a second side of the inner peripheral side part in the axis line direction from the small-diameter portion and which has a diameter that gradually increases toward the second side in the axis line direction; and
  a large-diameter portion which is continuous with the enlarged-diameter portion and extends toward the second side in the axis line direction from the enlarged-diameter portion and which is formed with an end portion at the second side in the axis line direction on the outer peripheral surface, the annular disc forms a second portion of the disc and is externally fitted to the large-diameter portion of the inner peripheral side part at a fitting portion, the blades are provided at intervals in a circumferential direction on a surface of the annular disc that faces the first side in the axis line direction and form a flow path extending in a radial direction, the cover covers the plurality of blades from the first side in the axis line direction, and has an insertion hole into which the inner peripheral side part is inserted in the axis line direction at an interval in a radial direction, the disc of the impeller is configured by the inner peripheral side part and the annular disc, in a cross section of the impeller that includes the axis line, the flow path is formed in a curved shape, and the outer peripheral side part is configured such that the annular disc, the blades and the cover are integrally molded.

3. The impeller according to claim 2, wherein
the annular disc is externally fitted to the large-diameter portion of the inner peripheral side part through shrink fitting.

4. The impeller according to claim 3, wherein:
an edge portion rising in a cylindrical shape from an inner side in a radial direction of the cover to the first side in the axis line direction is provided in the cover, and
an introduction portion of a fluid to the flow path is formed of the edge portion and the small-diameter portion of the inner peripheral side part.

5. The impeller according to claim 2, wherein
at least a portion of the fitting portion is formed in a step shape.

6. The impeller according to claim 2, wherein
at least a portion of the fitting portion is formed in a tapered shape.

7. The impeller according to claim 2, further comprising
a key member that fixes the inner peripheral side part and the outer peripheral side part to each other, the key member being interposed in the fitting portion.

8. A rotor comprising:
an impeller according to claim 2; and
a rotating shaft to which a portion at the first side in the axis line direction of an inner peripheral surface of the inner peripheral side part of the impeller is externally fitted.

9. The rotor according to claim 8, wherein
the inner peripheral side part is externally fitted to the rotating shaft through shrink fitting.

10. A method of manufacturing an impeller comprising an inner peripheral side part and an outer peripheral side part, the method comprising the steps of:
  molding the inner peripheral side part that is in a cylindrical shape around an axis line, and forming a first portion of a disc as the inner peripheral side part, wherein an outer peripheral surface of the inner peripheral side part includes:
    a small-diameter portion which is formed with an end portion at a first side of the inner peripheral side part in a direction of the axis line on the outer peripheral surface;
    an enlarged-diameter portion which is continuous with the small-diameter portion and extends toward a second side of the inner peripheral side part in the axis line direction from the small-diameter portion and which has a diameter that gradually increases toward the second side in the axis line direction; and
    a large-diameter portion which is continuous with the enlarged-diameter portion and extends toward the second side in the axis line direction from the enlarged-diameter portion and which is formed with an end portion at the second side in the axis line direction on the outer peripheral surface;
  integrally molding the outer peripheral side part including an annular disc, a plurality of blades and a cover, the annular disc forming a second portion of the disc and being capable of externally fitting to the large-diameter portion of the inner peripheral side part, the blades being provided at intervals in a circumferential direction on a surface of the annular disk that faces the first side in the axis line direction and forming a flow path extending in a radial direction, and the cover covering the plurality of blades from the first side in the axis line direction and having an insertion hole into which the inner peripheral side part is inserted in the axis line direction at an interval in the radial direction;
  forming the flow path in a curved shape in a cross section of the impeller that includes the axis line; and
  fixing and integrating the inner peripheral side part and the outer peripheral side part by externally fitting the annular disc to a portion of the inner peripheral side part at the first side in the axis line direction.

* * * * *